US012621305B2

(12) United States Patent   (10) Patent No.:   US 12,621,305 B2
Dravneek et al.   (45) Date of Patent:   May 5, 2026

(54) SYSTEM FOR INITIALIZATION OF USER RESOURCE ACCOUNTS THROUGH ELECTRONIC DATA MONITORING OF NETWORKED SERVERS

(71) Applicant: BANK OF AMERICA CORPORATION, Charlotte, NC (US)

(72) Inventors: Victoria L. Dravneek, Charlotte, NC (US); Karen Lea MacQueen, Lyndhurst, OH (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 56 days.

(21) Appl. No.: 18/637,581

(22) Filed: Apr. 17, 2024

(65) Prior Publication Data

US 2025/0286892 A1    Sep. 11, 2025

Related U.S. Application Data

(60) Provisional application No. 63/459,846, filed on Apr. 17, 2023.

(51) Int. Cl.
H04L 9/40    (2022.01)
(52) U.S. Cl.
CPC ............ H04L 63/102 (2013.01); H04L 63/08 (2013.01); H04L 63/107 (2013.01)

(58) Field of Classification Search
CPC ...... H04L 63/102; H04L 63/08; H04L 63/107
See application file for complete search history.

(56) References Cited

U.S. PATENT DOCUMENTS

| | | | |
|---|---|---|---|
| 11,481,837 B1 * | 10/2022 | Brandt .................... | G06F 21/45 |
| 2019/0318122 A1 * | 10/2019 | Hockey .............. | G06F 21/6245 |
| 2021/0081947 A1 * | 3/2021 | Hockey .............. | H04L 63/0838 |
| 2021/0084032 A1 * | 3/2021 | Ding ......................... | G06F 9/54 |
| 2021/0314282 A1 * | 10/2021 | Sharma ................... | G06F 3/167 |

* cited by examiner

*Primary Examiner* — Khoi V Le
(74) *Attorney, Agent, or Firm* — Moore & Van Allen PLLC; Nicholas C. Russell

(57)    ABSTRACT

A system is provided for initialization of user resource accounts through electronic data monitoring of networked servers. In particular, the system may establish an authorized networked connection to one or more computing systems, where the one or more computing systems may store resource data associated with a user. Upon establishing the network connection, the system may aggregate various types of data associated with the user. The aggregated data may then be used to drive one or more automated processes with respect to the initialization of a user's resource account. The system may further present a unified dashboard on a display of a user device that may provide the user with a consolidated view of the aggregated data and/or the configuration changes generated by the system.

17 Claims, 4 Drawing Sheets

```
                                    ┌─ 200
PROMPT A USER TO LINK ONE OR MORE RESOURCE ACCOUNTS ASSOCIATED
                    WITH THE USER
                        202

RECEIVE AUTHORIZATION FROM THE USER TO LINK THE ONE OR MORE
                RESOURCE ACCOUNTS
                        204

ESTABLISH A SECURE COMMUNICATION LINK WITH ONE OR MORE THIRD
    PARTY SERVERS ASSOCIATED WITH THE ONE OR MORE RESOURCE
                ACCOUNTS OF THE USER
                        206

RETRIEVE RESOURCE ACCOUNT DATA ASSOCIATED WITH THE USER FROM
            THE ONE OR MORE THIRD PARTY SERVERS
                        208

BASED ON ANALYZING THE RESOURCE ACCOUNT DATA USING AN
    ARTIFICIAL INTELLIGENCE ENGINE, GENERATE ONE OR MORE
RECOMMENDATIONS FOR AT LEAST ONE CONFIGURATION CHANGE FOR THE
            ONE OR MORE RESOURCE ACCOUNTS
                        210

PRESENT THE ONE OR MORE RECOMMENDATIONS ON A UNIFIED
DASHBOARD, WHEREIN THE DASHBOARD IS CONFIGURED TO DISPLAY THE
                RESOURCE ACCOUNT DATA
                        212
```

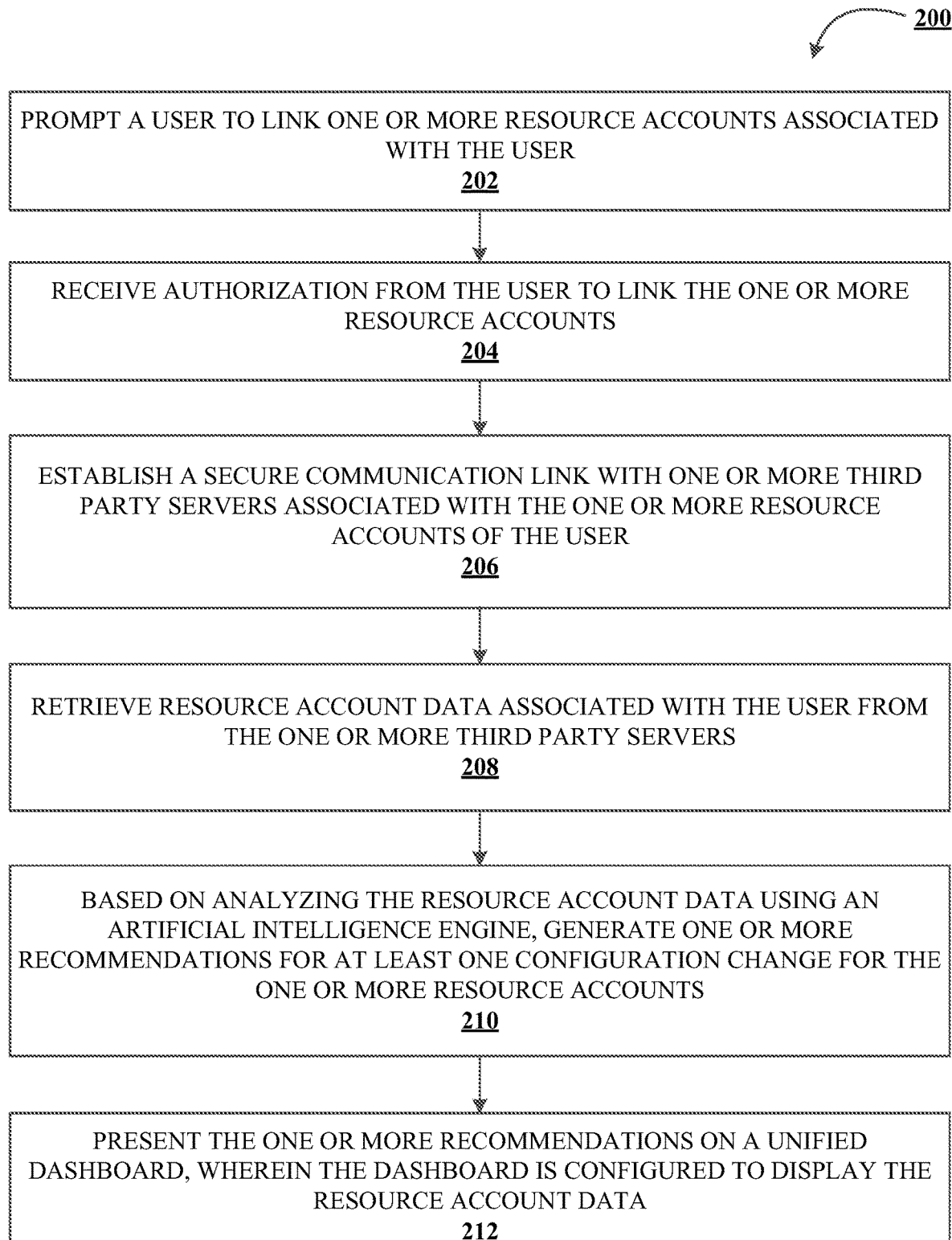

200

PROMPT A USER TO LINK ONE OR MORE RESOURCE ACCOUNTS ASSOCIATED
WITH THE USER
202

RECEIVE AUTHORIZATION FROM THE USER TO LINK THE ONE OR MORE
RESOURCE ACCOUNTS
204

ESTABLISH A SECURE COMMUNICATION LINK WITH ONE OR MORE THIRD
PARTY SERVERS ASSOCIATED WITH THE ONE OR MORE RESOURCE
ACCOUNTS OF THE USER
206

RETRIEVE RESOURCE ACCOUNT DATA ASSOCIATED WITH THE USER FROM
THE ONE OR MORE THIRD PARTY SERVERS
208

BASED ON ANALYZING THE RESOURCE ACCOUNT DATA USING AN
ARTIFICIAL INTELLIGENCE ENGINE, GENERATE ONE OR MORE
RECOMMENDATIONS FOR AT LEAST ONE CONFIGURATION CHANGE FOR THE
ONE OR MORE RESOURCE ACCOUNTS
210

PRESENT THE ONE OR MORE RECOMMENDATIONS ON A UNIFIED
DASHBOARD, WHEREIN THE DASHBOARD IS CONFIGURED TO DISPLAY THE
RESOURCE ACCOUNT DATA
212

FIG. 2

SYSTEM FOR INITIALIZATION OF USER RESOURCE ACCOUNTS THROUGH ELECTRONIC DATA MONITORING OF NETWORKED SERVERS

CROSS-REFERENCE TO RELATED APPLICATIONS

This application claims the benefit of U.S. Provisional Patent Application. No. 63/459,846, filed Apr. 17, 20203, the entirety of which is incorporated herein by reference.

FIELD OF THE INVENTION

The present invention embraces a system for initialization of user resource accounts through electronic data monitoring of networked servers.

BACKGROUND

There is a need for an efficient and secure way to perform initialization of user resource accounts.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

A system is provided for initialization of user resource accounts through electronic data monitoring of networked servers. In particular, the system may establish an authorized networked connection to one or more computing systems (e.g., servers), where the one or more computing systems may store resource data associated with a user. Upon establishing the network connection, the system may aggregate various types of data associated with the user. The aggregated data may then be used to drive one or more automated processes with respect to the initialization of a user's resource account. In some embodiments, the processes may include an AI-based recommendations engine that may be configured to output one or more recommendations for a configuration of the resource account of the user. The system may further present a unified dashboard on a display of a user device that may provide the user with a consolidated view of the aggregated data and/or the configuration changes generated by the system. In this way, the system provides an efficient and secure way to perform initialization of user resource accounts.

Accordingly, embodiments of the present disclosure provide a system for initialization of user resource accounts through electronic data monitoring of networked servers, the system comprising a processing device; a non-transitory storage device containing instructions when executed by the processing device, causes the processing device to perform the steps of: prompting a user to link one or more resource accounts associated with the user; receiving authorization from the user to link the one or more resource accounts; establishing a secure communication link with one or more third party servers associated with the one or more resource accounts of the user; retrieving resource account data associated with the user from the one or more third party servers; based on analyzing the resource account data using an artificial intelligence engine, generating one or more recommendations for at least one configuration change for the one or more resource accounts; and presenting the one or more recommendations on a unified dashboard, wherein the unified dashboard is configured to display the resource account data.

In some embodiments, establishing the secure communication link with the one or more third party servers comprises generating a shared authentication credential for the one or more third party servers; and authenticating the user on the one or more third party servers using the shared authentication credential.

In some embodiments, analyzing the resource account data comprises analyzing historical resource transfer data, wherein the historical resource transfer data comprises resource input and output data associated with the one or more resource accounts.

In some embodiments, analyzing the resource account data comprises detecting one or more anomalies, and wherein the one or more recommendations comprise a recommendation to correct the one or more anomalies.

In some embodiments, the one or more anomalies comprises an unintended recurring resource transfer.

In some embodiments, analyzing the resource account data comprises detecting potential unauthorized activity associated with the one or more resources accounts, and wherein the one or more recommendations comprises a prompt for the user to confirm whether the potential unauthorized activity was authorized.

In some embodiments, the one or more recommendations are based on a location of a user device associated with the user.

Embodiments of the present disclosure also provide a computer program product for initialization of user resource accounts through electronic data monitoring of networked servers, the computer program product comprising a non-transitory computer-readable medium comprising code causing an apparatus to perform the steps of prompting a user to link one or more resource accounts associated with the user; receiving authorization from the user to link the one or more resource accounts; establishing a secure communication link with one or more third party servers associated with the one or more resource accounts of the user; retrieving resource account data associated with the user from the one or more third party servers; based on analyzing the resource account data using an artificial intelligence engine, generating one or more recommendations for at least one configuration change for the one or more resource accounts; and presenting the one or more recommendations on a unified dashboard, wherein the unified dashboard is configured to display the resource account data.

In some embodiments, establishing the secure communication link with the one or more third party servers comprises generating a shared authentication credential for the one or more third party servers; and authenticating the user on the one or more third party servers using the shared authentication credential.

In some embodiments, analyzing the resource account data comprises analyzing historical resource transfer data, wherein the historical resource transfer data comprises resource input and output data associated with the one or more resource accounts.

In some embodiments, analyzing the resource account data comprises detecting one or more anomalies, and wherein the one or more recommendations comprises a recommendation to correct the one or more anomalies.

In some embodiments, the one or more anomalies comprises an unintended recurring resource transfer.

In some embodiments, analyzing the resource account data comprises detecting potential unauthorized activity associated with the one or more resources accounts, and wherein the one or more recommendations comprises a prompt for the user to confirm whether the potential unauthorized activity was authorized.

Embodiments of the present disclosure also provide a computer-implemented method for initialization of user resource accounts through electronic data monitoring of networked servers, the computer-implemented method comprising prompting a user to link one or more resource accounts associated with the user; receiving authorization from the user to link the one or more resource accounts; establishing a secure communication link with one or more third party servers associated with the one or more resource accounts of the user; retrieving resource account data associated with the user from the one or more third party servers; based on analyzing the resource account data using an artificial intelligence engine, generating one or more recommendations for at least one configuration change for the one or more resource accounts; and presenting the one or more recommendations on a unified dashboard, wherein the unified dashboard is configured to display the resource account data.

In some embodiments, establishing the secure communication link with the one or more third party servers comprises generating a shared authentication credential for the one or more third party servers; and authenticating the user on the one or more third party servers using the shared authentication credential.

In some embodiments, analyzing the resource account data comprises analyzing historical resource transfer data, wherein the historical resource transfer data comprises resource input and output data associated with the one or more resource accounts.

In some embodiments, analyzing the resource account data comprises detecting one or more anomalies, and wherein the one or more recommendations comprises a recommendation to correct the one or more anomalies.

In some embodiments, the one or more anomalies comprises an unintended recurring resource transfer.

In some embodiments, analyzing the resource account data comprises detecting potential unauthorized activity associated with the one or more resources accounts, and wherein the one or more recommendations comprises a prompt for the user to confirm whether the potential unauthorized activity was authorized.

In some embodiments, the one or more recommendations are based on a location of a user device associated with the user.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
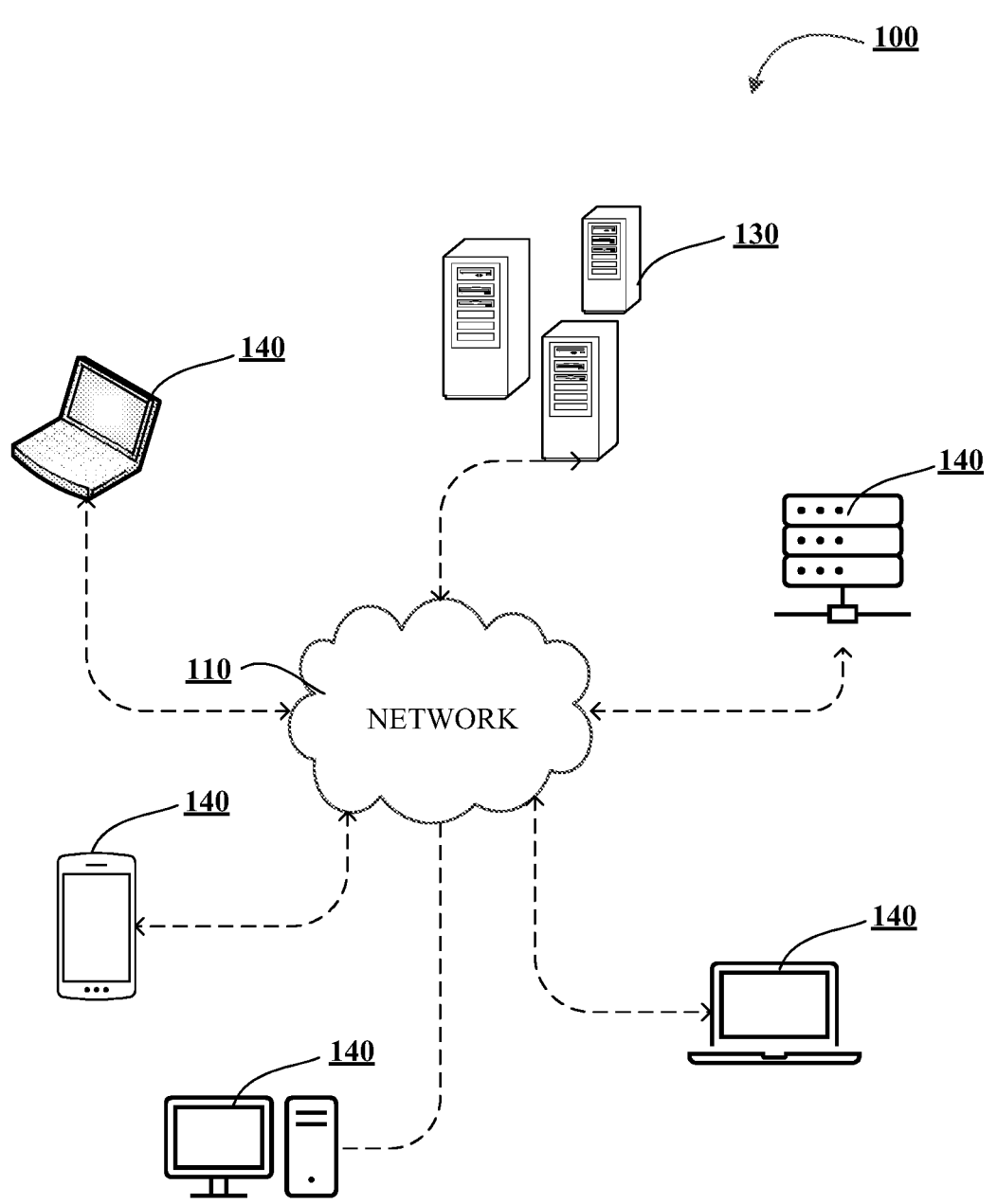
Figure 1B:
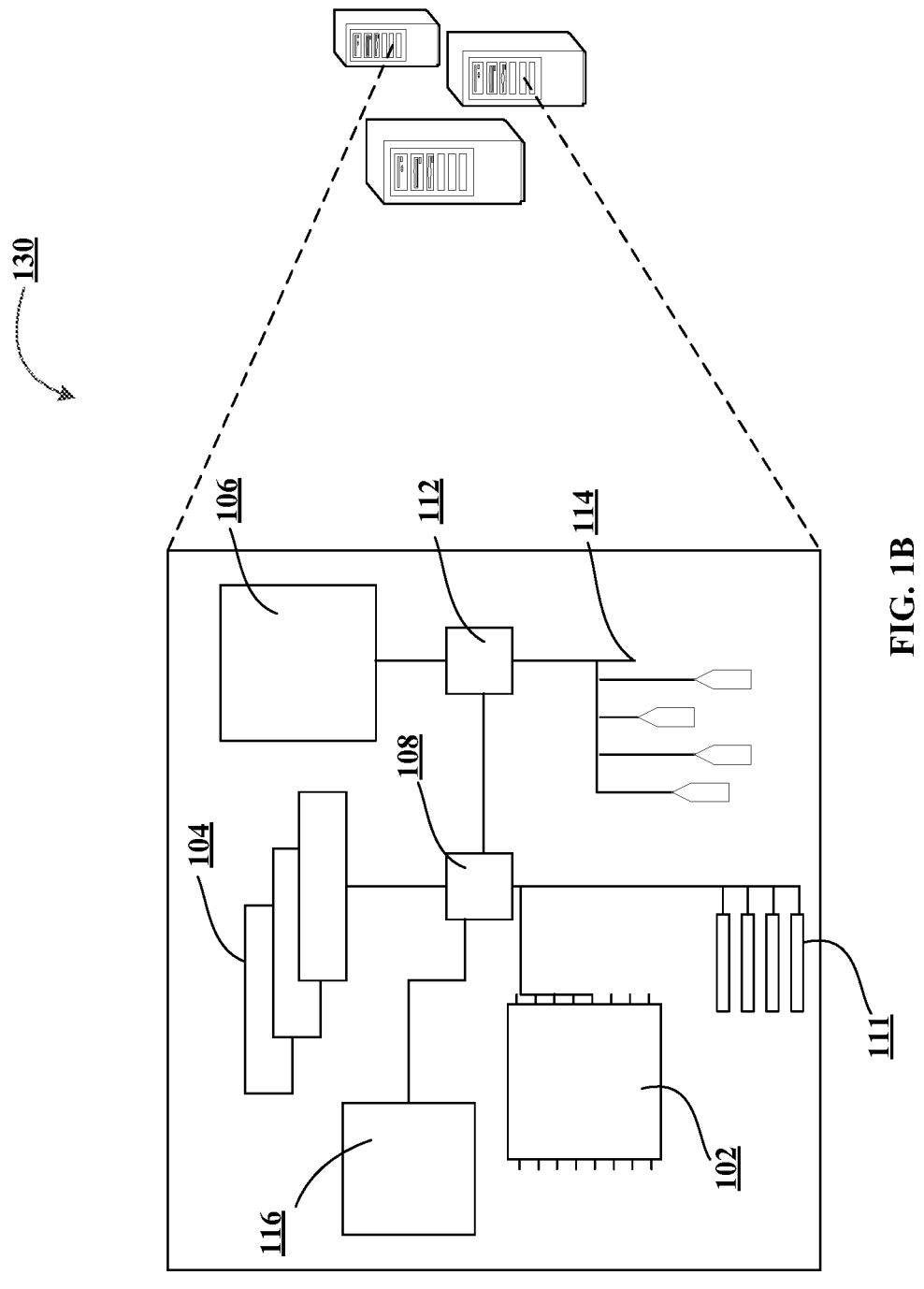
Figure 1C:
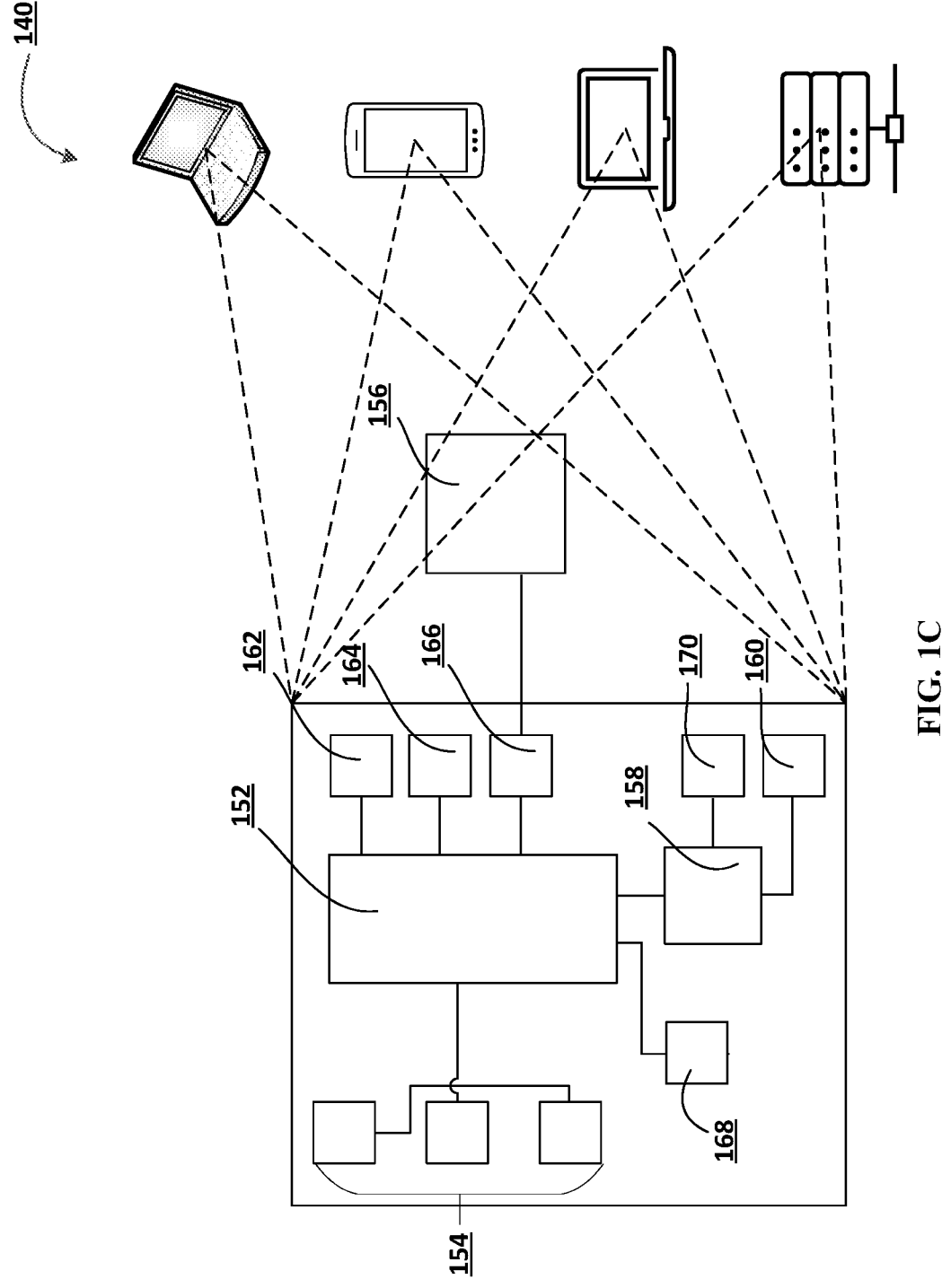

Having thus described embodiments of the invention in general terms, reference will now be made the accompanying drawings, wherein:

FIGS. 1A-1C illustrates technical components of an exemplary distributed computing environment for the system for initialization of user resource accounts through electronic data monitoring of networked servers, in accordance with an embodiment of the present disclosure; and FIG. 2 illustrates a process flow for initialization of user resource accounts through electronic data monitoring of networked servers, in accordance with an embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface ("GUI") or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system. In some embodiments, an engine may be an artificial intelligence ("AI") based engine that may use one or more machine learning algorithms to provide a data output (e.g., text, images, videos, audio, and/or the like) for a specified task based on a selected data input into the machine learning algorithms.

As used herein, "authentication credentials" may be any information that can be used to identify of a user. For example, a system may prompt a user to enter authentication information such as a username, a password, a personal identification number (PIN), a passcode, individual characteristic data (e.g., iris recognition, retina scans, fingerprints, finger veins, palm veins, palm prints, digital bone anatomy/ structure and positioning of distal phalanges, intermediate phalanges, proximal phalanges, and/or the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and the like.

As used herein, "resource" may generally refer to physical or virtual objects that may be used to accomplish the entity's objectives. In this regard, the resources may include computing resources such as processing power, memory allocation, cache space, storage space, data files, network connections and/or bandwidth, electrical power, input/output functions, and the like, or data files (e.g., document files, media files, system files, and/or the like). In other embodiments, resources may refer to financial resources such as funds or digital currencies, where such resources may be linked to an account associated with a user.

Electronic data associated with a user may be stored across numerous disparate servers or computing systems that may be owned and/or operated by various disparate entities. For instance, a user may hold a plurality of resource accounts with a number of organizations, where each of the resource accounts may have unique sets of configurations or settings as designated by the user and/or the organization that may be associated with each of the resource accounts. As a result, it may be difficult for the user to monitor and/or track the status of each of the resource accounts across the various servers to perform optimization of the various resource accounts. Accordingly, a more efficient way is needed to allow a user to securely view and change the configuration of the resource accounts of the user.

To address the technical problems as described above among others, the system as described herein provides for initialization of user resource accounts through electronic data monitoring of networked servers. In this regard, the system may prompt the user (e.g., by presenting a notification on a display device of a user device) to authorize the linking of one or more resource accounts associated with the user. The one or more resource accounts of the user may, in some embodiments, be maintained by one or more entities on behalf of the user. Upon receiving authorization from the user, the system may establish secure communication links over a network (e.g., the Internet) to one or more computing systems (e.g., servers) that may store data associated with the one or more resource accounts of the user. The data associated with the one or more resource accounts may include resource data and/or resource account data (e.g., data regarding the types of accounts and/or the resources within the accounts, and/or the like), resource transfer data (e.g., historical transaction data, resource inputs and outputs for the various resource accounts, resource transfer platforms or methods, and/or the like), product or service subscription data, scheduled account settings (e.g., recurring transfers, scheduled transfers, user preferences, data privacy settings, and/or the like), user-related data and/or metadata (e.g., biographical information, addresses, life stages, information regarding service or utility providers, and/or the like) and/or other types of data.

In such a configuration, the system may be configured to pull or retrieve the data associated with the user and/or push configuration changes regarding the one or more resource accounts of the user to the various computing systems that host the data associated with the user, where the various computing systems may be owned and/or operated by various third party entities. Through the communication links, the system may retrieve the various types of data associated with the user and aggregate the data. Once the data has been aggregated, the system may use the data to drive various processes (e.g., AI-based recommendations) with respect to the settings and/or configuration of the user's resource account.

An exemplary embodiment is provided as follows for illustrative purposes only. It should be understood that the following example, along with any other example provided herein, is not intended to restrict the scope of the disclosure. In one embodiment, the user may be a customer of one or more financial institutions, where the user may hold resource accounts (e.g., checking or savings accounts, retirement accounts, investment accounts, and/or the like) with one or more of the financial institutions. Each of the resource accounts with the financial institutions may be associated with unique sets of user-defined or institution-defined settings or configurations. For example, the user may set a first recurring resource transfer (e.g., recurring payments at the beginning of each month) to be executed using a first resource account with a first financial institution, while setting a second recurring resource transfer to be executing using a second resource account with a second financial institution. Furthermore, the user may be signed up for certain products or services (e.g., automatic payments, direct deposit, rewards enrollment, and/or the like) with certain financial institutions but not others. Accordingly, it may become difficult for the user to track and/or monitor the various resource accounts with various different financial institutions, along with the disparate configurations and/or settings associated with each resource account. By linking the resource accounts and allowing the system to aggregate all of the data associated with the user as described herein, the system may provide a way to provide a holistic view of the resources and/or resource accounts of the user. An exemplary, non-exhaustive list of features of the system are provided below.

Unified Dashboard of Resource Accounts

In some embodiments, the system may present a unified dashboard to the user (e.g., by presenting a graphical user interface on a display device of the user device), where the unified dashboard allows the user to view the various resource-related data across all of the resource accounts of the user. In this regard, the dashboard may display the resource accounts of the user, which organization is hosting each resource account, the amount and/or type of resources held in each account, configurations and/or settings associated with each resource account or organization, and/or the like.

Continuing the above example, the dashboard may allow the user to view the balances for each of the resource accounts held with each of the financial institutions. Furthermore, the system may provide an entire view of the flow of resources into and/or out of each of the resource accounts across all payment rails and/or channels (e.g., debit, ACH, and/or the like). In this way, the unified dashboard allows the system to generate a holistic view of a user's financials in spite of the relevant resource data being spread across a number of disparate servers which may be hosted by various different third party entities.

The dashboard may further be configured to present notifications regarding what a new user can expect in an upcoming timeframe after initializing a new resource account. For instance, a new user may wish to inquire how to set up direct deposits, when they may receive new debit cards or checks, and/or the like. In such an embodiment, the dashboard may comprise an interface element that may allow the user to pose the questions (e.g., by inputting text into a text entry field), which may then be answered through an AI-powered assistant.

User Resource Account Initialization Based on User Data

In some embodiments, the system may perform intelligent initialization of a new resource account for the user (e.g., user onboarding) based on analyzing the data associated with the user. In this regard, the system may use information such as biographical data, address information, contact information, and/or the like associated with the user to optimally match the user with certain services and/or products offered by the entity. In this regard, the system may use the data associated with the user to generate a financial portrait of the user and recommend to the user products or services that may be suitable or optimal for the user. For example, the system may detect that the user is currently enrolled in a particular product (e.g., a savings account with a fixed interest rate) with a third party financial institution. Upon detecting that the user is enrolled in such a product, the system may be configured to transmit a notification on the dashboard with an offer for an upgraded product (e.g., a savings account with a higher interest rate). The notification may comprise an interactive element that, when activated by the user (e.g., by clicking on a button or interactable area), may cause a form to be displayed on the dashboard, where the form may be an onboarding form that may have one or more fields that are automatically populated using the aggregated data associated with the user.

In some embodiments, the system may be configured to provide certain recommendations based on a change in status of a user. For instance, if the system detects that the user has moved addresses, the system may be configured to display notifications for offers relevant to the area to which the user has moved (e.g., offers to sign on with partnered utility providers). The system may further be configured to present notifications regarding entity locations to the user (e.g., financial centers associated with the entity) within a predefined distance of the user's new address. The system may further be configured to track one or more life events associated with the user (e.g., moving addresses, finishing education, and/or the like). In such embodiments, the system may be configured to provide a projected timeline and estimation of costs typically incurred by other users who experience such life events.

In some embodiments, the system may continuously prompt the user to input additional information to maintain a constantly updated portrait of the user and/or the user's resource accounts. In an exemplary embodiment, the system may determine that the user has set up automatic payments for certain services or products (e.g., utilities such as water and electricity) but not others (e.g., Internet service). Upon detecting a potential gap in the user portrait, the system may, through the dashboard, prompt the user to indicate whether the user is currently signed up for the missing service. If the user responds in the affirmative, the system may further inquire regarding what payments the user may be making for such a service and subsequently offer the user to port the payments to the entity's systems. If the user once again responds in the affirmative, the system may present a pre-filled onboarding form to the user as described elsewhere herein.

AI-Based or AI-Assisted Recommendations Engine

In some embodiments, the system may generate intelligent recommendations based on the data associated with the user by providing AI-based recommendations with respect to changing a configuration of the user's resource accounts, by pre-populating one or more initialization or onboarding forms based on the pre-existing data, and/or the like. In this regard, the system may analyze the current configuration or settings for each of the resource accounts and offer settings optimization recommendations based on analyzing the configuration or settings. For example, the system may detect that the user is currently enrolled in automatic payments with a resource account hosted by a third party entity. Subsequently, the system may transmit a recommendation (e.g., through the unified dashboard) for the user to port the automatic payments settings from the existing resource account to a new resource account managed by the entity associated with the system described herein. In some embodiments, the system may generate a checklist to be presented on the dashboard such that the user may select (e.g., by checking or unchecking) which services or products that the user wishes to be ported over.

In some embodiments, the AI engine may analyze the historical resource transfer data (e.g., past transactions, transaction labels, transferee information, transaction dates, and/or the like) and proactively provide suggested configuration changes based on analyzing the historical resource transfer data. For instance, the user's transaction history may indicate that the user makes a resource transfer at the same time each month. The system may further review the data associated with the user and determine that a recurring resource transfer is not currently set up for this transaction (e.g., the user manually executes the resource transfer each time). In such embodiments, the system may generate a recommendation to set up a recurring resource transfer based on one or more optimized parameters determined by the AI engine. In this regard, the AI engine may set parameters that may provide the largest benefit to the user (e.g., faster transaction times, ease of use, and/or the like) and/or conforms to user defined preferences (e.g., resource amount limits, timeframe-based restrictions, and/or the like).

In some embodiments, the dashboard may be configured to present an AI-powered digital advisor that may provide AI-generated recommendations in real time. In this regard, the system may monitor the actions taken by the user within the dashboard (e.g., text inputs, mouse clicks, touchscreen taps, voice commands, and/or the like) and, based on monitoring the actions, generate a prediction regarding the intent of the user within the dashboard. For instance, the system may detect that the user is attempting to execute a manual resource transfer that the system has identified may be a recurring transfer. In such an embodiment, upon detecting that the user is attempting to manually execute the resource transfer, the digital advisor may present a notification to the user (e.g., within a frame or window of the dashboard) prompting the user to indicate whether the user wishes to set up a recurring resource transfer. If the user responds in the affirmative (e.g., by interacting with a button or selectable area of the notification), the system may present a form to the user on the dashboard for setting up the recurring resource transfer. In some embodiments, one or more of the fields within the form may be pre-filled based on the AI engine analyzing the historical resource transfer data associated with the user.

The system may further be configured to intelligently recommend certain products or services based on the user portrait. For instance, the system may, based on the inputs and outputs of resources through the user's resource accounts, determine that the user receives payouts on an on-demand basis. In such embodiments, the system may recommend a payout date that maximizes the amount of resources that may be paid out to the user's resource accounts. In some embodiments, the system may further analyze the inputs and outputs of resources to offer transaction smoothing (e.g., normalizing payments over time).

Resource Account and Data Labeling

In some embodiments, the system may be configured to allow the user to designate a label for each resource account within the dashboard (e.g., by entering a text-based label into a text entry field associated with each resource account). Upon receiving a label from the user, the system may use a natural language processing ("NLP") based algorithm to parse the text input and generate recommendations based on the label. For instance, the user may designated a particular resource account as a caregiver account. In such an embodiment, the system may modify the initialization/onboarding questions that may be posed to the user and subsequently provide specific recommendations related to the particular label (e.g., if the resource account is a caregiver account, the system may recommend that the user sets up a power of attorney).

Bidirectional Communication Channel with Third Party Systems

As described above, in some embodiments, the system may be configured to push data to and/or retrieve data from the various third-party computing systems that may store data associated with the user. In some embodiments, the system may further be configured, for the user's convenience, to push data to and/or retrieve data from other types of third party systems that may be associated with the user. In an exemplary embodiment, upon detecting that the user has moved addresses, the system may, upon receiving authorization from the user, to push the new address information to various third party entities associated with the user (e.g., government agencies, new employers, utility or other service providers, and/or the like).

In some embodiments, the system may further use the AI engine to detect anomalies and/or opportunities to optimize the user's resource accounts based on analyzing the resource account data. For instance, the system may analyze the transaction history of the user and determine that duplicate transactions have been executed for a particular subscription service or may detect that a better offer (e.g., a better rate) may be applicable to the user. In such embodiments, the system may be configured to push a notification to the third party entities associated with such services to correct the errors and/or apply for the better offer on behalf of the user.

Security, Data Privacy, and Detection of Unauthorized Activity

In some embodiments, the system may analyze the resource related activity associated with the user across all resource accounts using the AI engine to detect potential unauthorized activity. Upon detecting the potential unauthorized activity, the system may present a notification on the dashboard regarding the potential unauthorized activity that prompts the user to confirm whether the activity was authorized. For example, the system may detect that an account was opened at a particular third party financial institution with the same name as the user. In this way, the system may provide for enhanced resource account security with respect to all of the user's resource accounts across all entities.

The system may further be configured to allow the user to fine-tune permissions with respect to what portions of data associated with the user is shared with the system. In this regard, the user may allow the user to select and/or unselect the data that is shared with the system (e.g., the user may wish to share information regarding one resource account, but not another). Furthermore, the system may use the AI engine to predict the preferences of the user with respect to the level of engagement with fine-tuning the data privacy permissions. For instance, based on detecting that the user often provides customized user preferences and/or settings, the system may present a granular list of data privacy settings to the user. On the other hand, if the system detects that the user often proceeds with standardized settings, the system may provide a simplified list of data privacy settings to the user.

Integrated Permissions Platform/Centralized Authentication

In some embodiments, the system may provide an integrated platform with shared permissions with each of the entities with which the user has a relationship. In particular, the system may generate a shared authentication credential that may be used across multiple institutions that may be used to authorize resource account linking and/or data sharing on an ongoing basis. In this regard, the shared authentication credential may be a secure token, certificate, private key, and/or the like that may be used to authenticate the user across multiple different platforms. By using the shared authentication credential, the system may prevent the need for the user to log in individually to each resource account that the user wishes to link to the system.

FIGS. 1A-1C illustrate technical components of an exemplary distributed computing environment 100 for the system for initialization of user resource accounts through electronic data monitoring of networked servers. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. For instance, the functions of the system 130 and the endpoint devices 140 may be performed on the same device (e.g., the endpoint device 140). Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it. In some embodiments, the system 130 may provide an application programming interface ("API") layer for communicating with the end-point device(s) 140.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as servers, networked storage drives, personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 connecting to low speed bus 114 and storage device 106. Each of the components 102, 104, 106, 108, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier.

The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow 200 for initialization of user resource accounts through electronic data monitoring of networked servers, in accordance with an embodiment of the present disclosure. The process begins at block 202, where the system prompts a user to link one or more resource accounts associated with the user. In this regard, the user may hold various resource accounts that may be maintained by various third party entities. Accordingly, prompting the user may comprise transmitting a notification to a user device associated with the user, where the notification is presented on a display device of the user device (e.g., a monitor or screen). The notification may comprise a prompt to link the one or more resource accounts. In this regard, the notification may comprise an interactive link that, when activated by the user, presents an online portal through which the user may designate the resource accounts that the user wishes to link with the system.

The process continues to block 204, where the system receives authorization from the user to link the one or more resource accounts. Continuing the above example, the system may receive the authorization from the user to link at least one resource account through the online portal. In some embodiments, the authorization to link the resource account may comprise one or more data privacy restrictions that may limit the types of data that may be accessed by the system. For instance, the data privacy restrictions may restrict access to resource account balances, transactions occurring within, before, or after a certain timeframe, transaction labels and/or metadata, and/or the like.

The process continues to block 206, where the system establishes a secure communication link with one or more third party servers associated with the one or more resource accounts of the user. In some embodiments, the system may establish a shared authentication credential that may be used by the system to maintain the secure communication channel such that data may be retrieved from the third party servers and/or pushed to the third-party servers on a persistent basis.

The process continues to block 208, where the system retrieves resource account data associated with the user from the one or more third party servers. The resource account data may include, for instance, resource account balances, historical resource transfer data, resource inflows and outflows, resource account labels, subscription data, and/or the like. In some embodiments, the system may further be configured to retrieve additional information associated with the user, such as biographical information, contact information, location information, user preferences, and/or the like. By retrieving the various types of information associated with the user, the system may drive its recommendation engine and/or train the machine learning models used to generate such recommendations.

The process continues to block 210, where the system, based on analyzing the resource account data using an artificial intelligence engine, generates one or more recommendations for at least one configuration change for the one or more resource accounts. The at least one configuration change may include changes such as setting up recurring resource transfers, onboarding a user for a product or service, changing user preferences, and/or other changes as described elsewhere herein.

The process proceeds to block 212, where the system presents the one or more recommendations on a unified dashboard, wherein the dashboard is configured to display the resource account data. The unified dashboard may provide the user with a holistic view of all inputs and outputs of all of the resource accounts that have been linked by the user. In this regard, in some embodiments, the unified dashboard may present a mapping of all resource transfers executing using the user's resource accounts. In this way, the system provides the user with a user-friendly way to view the data associated with the user, which may be stored across various disparate servers and/or managed by various different third party entities.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for initialization of user resource accounts through electronic data monitoring of networked servers, the system comprising:

a processing device;

a non-transitory storage device containing instructions when executed by the processing device, causes the processing device to perform the steps of:

prompting a user to link a plurality of resource accounts associated with the user;

receiving authorization from the user to link the plurality of resource accounts;

establishing a secure communication link with one or more third party servers associated with the plurality of resource accounts of the user;

generating a single shared authentication credential for the one or more third party servers;

authenticating the user on the one or more third party servers using the single shared authentication credential;

retrieving resource account data associated with the user from the one or more third party servers;

analyze the resource account data to determine current configurations of the one or more resource account, via an artificial intelligence engine;

based on analyzing the resource account data using the artificial intelligence engine, generating one or more recommendations for at least one configuration change for at least one resource account of the plurality of resource accounts, wherein the at least one configuration change is based on the current configurations of at least one other resource account of the plurality of resource accounts; and presenting the one or more recommendations on a unified dashboard, wherein the unified dashboard is configured to display the resource account data.

2. The system of claim 1, wherein analyzing the resource account data comprises analyzing historical resource transfer data, wherein the historical resource transfer data comprises resource input and output data associated with the plurality of resource accounts.

3. The system of claim 1, wherein analyzing the resource account data comprises detecting one or more anomalies, and wherein the one or more recommendations comprise a recommendation to correct the one or more anomalies.

4. The system of claim 3, wherein the one or more anomalies comprises an unintended recurring resource transfer.

5. The system of claim 1, wherein analyzing the resource account data comprises detecting potential unauthorized activity associated with the plurality of resource accounts, and wherein the one or more recommendations comprises a prompt for the user to confirm whether the potential unauthorized activity was authorized.

6. The system of claim 1, wherein the one or more recommendations are based on a location of a user device associated with the user.

7. A computer program product for initialization of user resource accounts through electronic data monitoring of networked servers, the computer program product comprising a non-transitory computer-readable medium comprising code causing an apparatus to perform the steps of:

prompting a user to link a plurality of resource accounts associated with the user;

receiving authorization from the user to link the plurality of resource accounts;

establishing a secure communication link with one or more third party servers associated with the plurality of resource accounts of the user;

generating a single shared authentication credential for the one or more third party servers;

authenticating the user on the one or more third party servers using the single shared authentication credential;

retrieving resource account data associated with the user from the one or more third party servers;

analyzing the resource account data to determine current configurations of the one or more resource account, via an artificial intelligence engine;

based on analyzing the resource account data using the artificial intelligence engine, generating one or more recommendations for at least one configuration change for at least one resource account of the plurality of resource accounts, wherein the at least one configuration change is based on the current configurations of at least one other resource account of the plurality of resource accounts; and presenting the one or more recommendations on a unified dashboard, wherein the unified dashboard is configured to display the resource account data.

8. The computer program product of claim 7, wherein analyzing the resource account data comprises analyzing historical resource transfer data, wherein the historical resource transfer data comprises resource input and output data associated with the plurality of resource accounts.

9. The computer program product of claim 7, wherein analyzing the resource account data comprises detecting one or more anomalies, and wherein the one or more recommendations comprises a recommendation to correct the one or more anomalies.

10. The computer program product of claim 9, wherein the one or more anomalies comprises an unintended recurring resource transfer.

11. The computer program product of claim 7, wherein analyzing the resource account data comprises detecting potential unauthorized activity associated with the plurality of resource accounts, and wherein the one or more recommendations comprises a prompt for the user to confirm whether the potential unauthorized activity was authorized.

12. A computer-implemented method for initialization of user resource accounts through electronic data monitoring of networked servers, the computer-implemented method comprising:

prompting a user to link a plurality of resource accounts associated with the user;

receiving authorization from the user to link the plurality of resource accounts;

establishing a secure communication link with one or more third party servers associated with the plurality of resource accounts of the user;

generating a single shared authentication credential for the one or more third party servers;

authenticating the user on the one or more third party servers using the single shared authentication credential;

retrieving resource account data associated with the user from the one or more third party servers;

analyzing the resource account data to determine current configurations of the one or more resource account, via an artificial intelligence engine;

based on analyzing the resource account data using the artificial intelligence engine, generating one or more recommendations for at least one configuration change for at least one resource account of the plurality of resource accounts, wherein the at least one configuration change is based on the current configurations of at least one other resource account of the plurality of resource accounts; and presenting the one or more recommendations on a unified dashboard, wherein the unified dashboard is configured to display the resource account data.

13. The computer-implemented method of claim 12, wherein analyzing the resource account data comprises analyzing historical resource transfer data, wherein the historical resource transfer data comprises resource input and output data associated with the plurality of resource accounts.

14. The computer-implemented method of claim 12, wherein analyzing the resource account data comprises detecting one or more anomalies, and wherein the one or more recommendations comprises a recommendation to correct the one or more anomalies.

15. The computer-implemented method of claim 14, wherein the one or more anomalies comprises an unintended recurring resource transfer.

16. The computer-implemented method of claim 12, wherein analyzing the resource account data comprises detecting potential unauthorized activity associated with the plurality of resource accounts, and wherein the one or more recommendations comprises a prompt for the user to confirm whether the potential unauthorized activity was authorized.

17. The computer-implemented method of claim 12, wherein the one or more recommendations are based on a location of a user device associated with the user.

\* \* \* \* \*